Sept. 8, 1959 D. L. CURTIS 2,903,677

TIMING TRACK RECORDING APPARATUS

Filed Jan. 13, 1956 5 Sheets-Sheet 1

DANIEL L. CURTIS,
INVENTOR

BY Henry Heyman
ATTORNEY

DANIEL L. CURTIS,
INVENTOR
BY Henry Heyman
ATTORNEY

DANIEL L. CURTIS,
INVENTOR

BY Henry Heyman
ATTORNEY

Sept. 8, 1959 D. L. CURTIS 2,903,677

TIMING TRACK RECORDING APPARATUS

Filed Jan. 13, 1956 5 Sheets-Sheet 4

DANIEL L. CURTIS,
INVENTOR

BY Henry Heyman
ATTORNEY

TIMING TRACK RECORDING APPARATUS

DANIEL L. CURTIS,
INVENTOR

BY Henry Heyman
ATTORNEY 2,903,677
Patented Sept. 8, 1959

2,903,677

TIMING TRACK RECORDING APPARATUS

Daniel L. Curtis, Manhattan Beach, Calif., assignor to Hughes Aircraft Company, Culver City, Calif., a corporation of Delaware Application January 13, 1956, Serial No. 558,990
9 Claims. (Cl. 340—174)

This invention relates to recording systems and more particularly to a system for recording a continuous timing track of uniformly spaced clock pulses on a recording channel of a computer memory drum.

In certain digital computing machinery all operations are timed or synchronized by clock or timing signals which are essentially uniformly spaced electrical pulses. In order to insure reliable operation of a digital computer, it is essential that the clock pulses be of constant amplitude, be accurately and uniformly spaced and thus free from time modulation, and in addition do not contain transient and spurious signals.

In a digital computer employing a rotating drum-type memory, it is conventional and highly convenient to reserve a memory channel on the drum for recording a timing track of uniformly spaced clock pulses. To accomplish this, either a rectangular or sine wave signal of constant frequency is initially recorded on the channel which, when reproduced, will provide uniformly spaced clock pulses for synchronizing the other operations of the computer.

Although this method of providing clock pulses is highly efficient in theory since the digital computer thereby supplies its own synchronizing signals which are synchronized with the rotation of the drum, much difficulty has been encountered in the past in accurately and reliably recording the timing track on the drum. Among the most serious problems encountered are the difficulty of recording precisely uniformly spaced sine or rectangular wave signals to produce a timing track of the exact desired number of cycles with accurate in-phase overlap between the origin and terminal end of the timing track without the introduction of transient or other spurious undesired signals.

Although it is possible to utilize a crystal-controlled oscillator as a source of constant frequency signals for recording on the timing track of the drum, it is extremely difficult to maintain the angular velocity of the rotating drum sufficiently constant to accurately record the desired signal. Even a monentary slight variation in angular velocity of the drum will cause out-of-phase overlapping of the recorded timing track, thus resulting in a discontinuous track. For the same reason it is difficult to record a timing track having precisely the desired number of recorded pulses around the circumference of the timing track channel.

It is apparent, therefore, that in order to accurately and reliably record a timing track on the rotating memory drum of a digital computer, the frequency of the signals being recorded on the channel must be regulated at all times in accordance with the instantaneous angular velocity of the drum itself. In other words, there must be an interdependent relationship between the angular velocity of the rotating drum and the frequency of the signals being recorded on the timing track. Such a relationship has been attempted in the past by various mechanical and electromechanical systems for linking the angular motion of the drum with the signal source utilized for recording the timing track. Most prominent among these systems have been the etching or grooving system, the toothed-wheel system, and the crystal controlled oscillator synchronous-motor system.

The etching or grooving system, as the name implies, attempts to synchronize the frequency or repetition rate of the signals recorded on the timing track with the rotational velocity of the drum by directly etching or grooving a timing track on the drum. This is accomplished by either etching or cutting a series of slots around the periphery of the drum thereby producing a variable magnetic reluctance path to serve as a timing track. When the drum is rotated, a magnetic reading head is stationed above the surface of the timing track for producing electrical clock pulse signals corresponding to the variable reluctance path of the etched or machined timing track. In addition to the laborious nature of the etching or machining process, this method has many other inherent disadvantages, among which are the mechanical errors introduced in machining or etching the grooves and the inability to readily vary the number of clock pulses recorded on the timing track.

In the toothed-wheel system, signals for recordation on the timing track are derived from a toothed wheel which is mechanically coupled to the revolving drum and rotated thereby. Electrical signals for recording the timing track on the drum are derived from a magnetic reading head stationed near the peripheral surface of the toothed wheel, an electrical signal being produced by the head upon passage of each tooth of the wheel in proximity of the reading head. Although this system has the advantage of permitting a selection of the number of pulses recorded on the timing track of the drum by exchanging wheels containing a different number of teeth, this system is subject to errors introduced by the mechanical play inherent in all known mechanical coupling devices. For example, the play inherent in the mesh of even a high precision gear train is sufficient to introduce considerable time modulation in a series of pulses produced by this system. In addition, the play in the coupling means employed causes an in-phase overlapping of the timing track produced to be a result of chance rather than be a certainty. It will be apparent that if the toothed wheel is directly coupled to the revolving drum in order to eliminate coupling errors the system becomes tantamount to the grooving system previously discussed.

In the crystal controlled oscillator synchronous-motor system, a common signal source is utilized for controlling both the speed of rotation of the memory drum and the frequency or repetition rate of the signals recorded on the timing track of the drum. In practice, constant frequency signals are produced by a crystal controlled oscillator serving as a signal source. These signals are amplified and utilized for energizing a synchronous motor and also for recording clock pulses on the timing track of the drum. The drum is directly coupled to the synchronous motor and rotated thereby. In this manner the rotational velocity of the drum and the frequency of the signals recorded on the timing track are both controlled from a common primary source.

In actual practice, the crystal controlled oscillator synchronous-motor system has certain inherent disadvantages. Any variation in the frequency of the signals from the primary signal source will be instantaneously effective to alter correspondingly the frequency of the signals recorded on the timing track of the drum. Due to the relatively large inertia of the drum, however, a time lag occurs between changes in frequency of the primary source and any corresponding change in angular velocity of the drum. This not only results in temporarily erratic recording of the timing track but starts a hunting effect wherein the motor and drum attempt to maintain an angular velocity corresponding to the frequency of the primary signals. Although it is theoretically possible to minimize this hunting effect by utilizing a sufficiently large synchronous motor, the resulting system becomes large and inefficient since the advantages of utilizing the synchronous motor no longer apply after the timing track is recorded and the drum is revolved for other operations of the digital computer.

Accordingly, it is an object of the present invention to provide a system for rapidly recording a continuous timing track around a recording channel of a rotating memory drum.

Another object of the present invention is to provide a system of the type referred to which will record a timing track of uniformly spaced clock pulses around a recording channel of a memory drum.

It is also an object of the present invention to provide a recording system of the type referred to which will record a timing track of any desired number of clock pulses on the drum independent of the rotational velocity thereof.

A still further object of the present invention is to provide a system of the class referred to which is not subject to mechanical errors for recording a continuous timing track with in-phase overlap and free from transient and other spurious signals.

According to the basic concepts of the present invention, a timing track of any desired number of clock pulses is obtained on a continuously rotating magnetic memory drum by continually recording clock pulses or timing signals on the timing track of the drum in a manner whereby each pulse as it is recorded erases any previously recorded pulse recorded on the same spot of the drum. The frequency or repetition rate of the clock pulses being recorded on the drum is then varied until a timing track of exactly the desired number of clock pulses with in-phase overlap has been recorded on the drum. When this has been achieved, the recording of the timing track is interrupted in a manner to preserve the desired recorded track free from transient or other unwanted spurious signals.

The above process is accomplished by comparing, at the end of each revolution of the drum, the number of clock pulses recorded during that revolution with the number of clock pulses desired. As a result of the above comparison process, the frequency of the signals being recorded on the timing tracks are altered appropriately until exactly the desired number of clock pulses has been recorded during a previous revolution of the drum. When this has occurred, minute frequency adjustment is made until there is an in-phase overlap of the timing track, at which time the recording is interrupted at the proper moment to provide a continuous timing track of the desired number of clock pulses with in-phase overlap. The recorded timing track is then played back to check its accuracy.

In its basic structural form, the timing track recording system of the present invention comprises a variable frequency recording circuit, a drum revolution indicator, a counting circuit, and a comparator. Clock pulse signals produced by the variable frequency recording circuit are continuously recorded on the timing track channel of a rotating magnetic drum. The drum revolution indicator is coupled to the rotating magnetic drum in a manner to produce a revolution indicating or origin pulse signal once during each revolution of the drum indicating the beginning of each revolution. The counting circuit is responsive to the clock pulse signals produced by the recording circuit and the origin pulse for counting the clock pulse signals and for producing an output signal, during each revolution of the drum indicating when, during the revolution, the desired number of clock pulses has been recorded on the timing track. The signals produced by the counting circuit and the signals produced by the drum revolution indicator are compared for time coincidence by the comparator circuit to determine when the exact number of clock pulse signals desired has been accurately recorded on the timing track.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
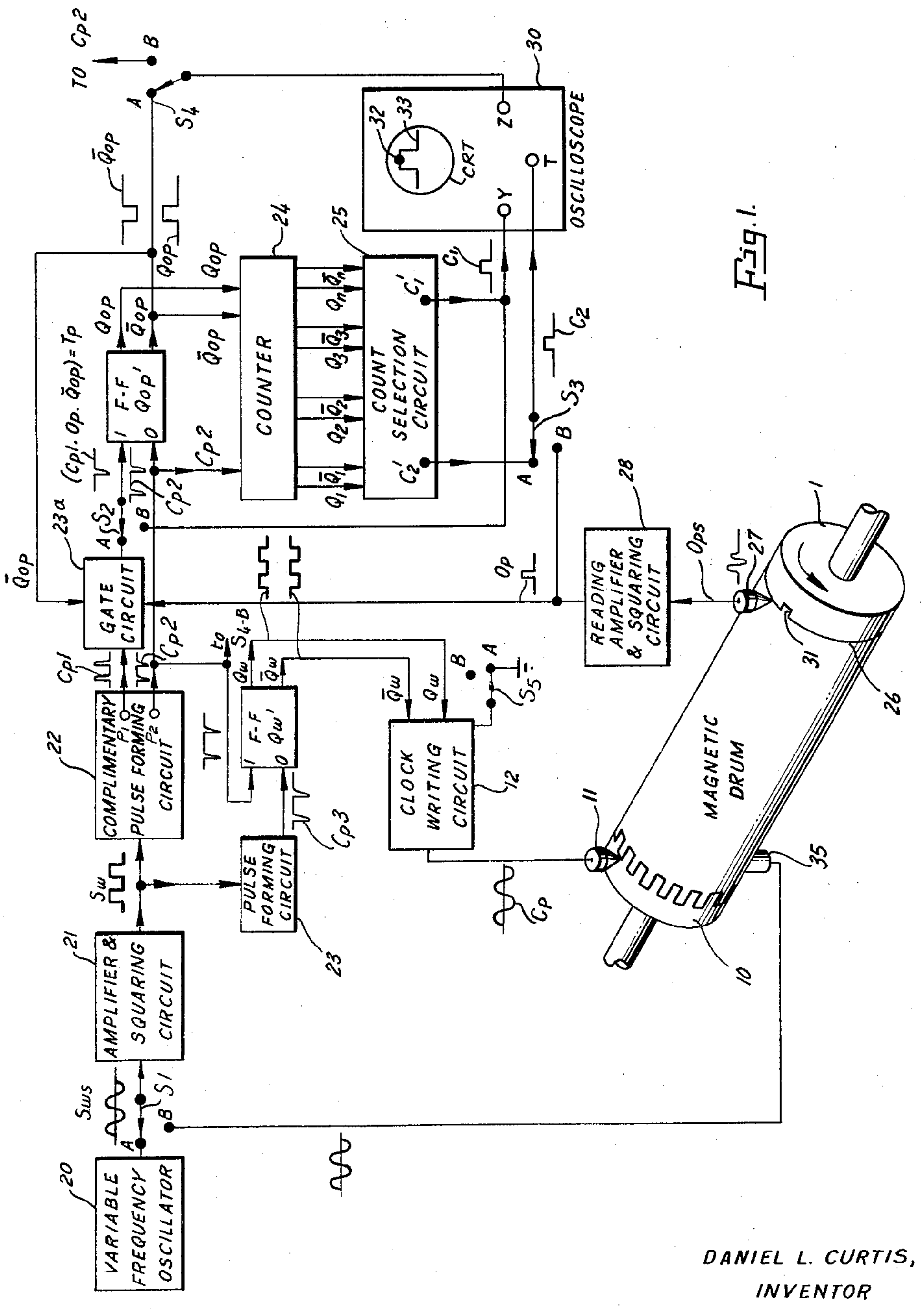
Fig. 1 is a schematic diagram in block form of an embodiment of the timing track recording system of the present invention.
Figure 4:
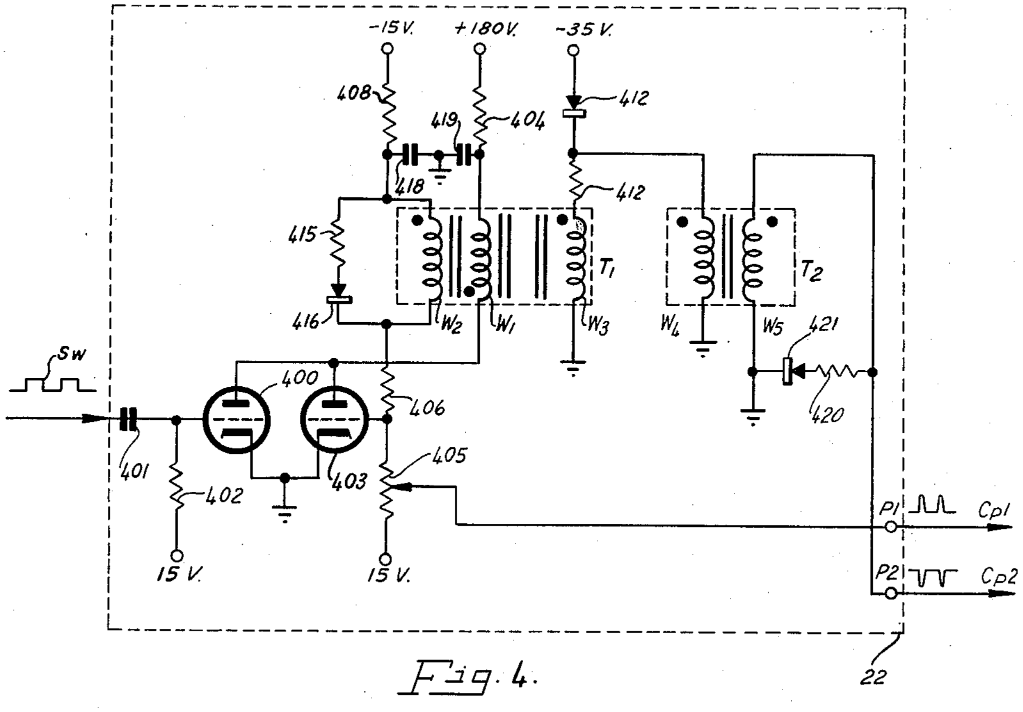
Figure 3A:
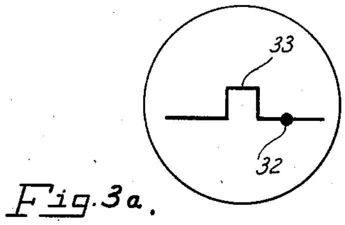
Figure 3B:
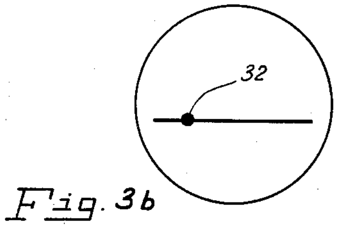
Figure 5:
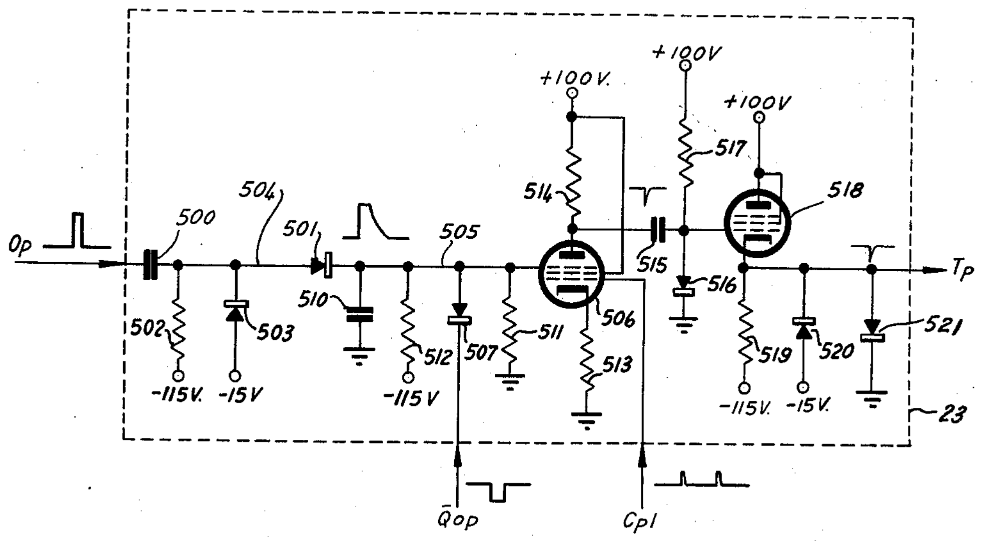
Figure 6:
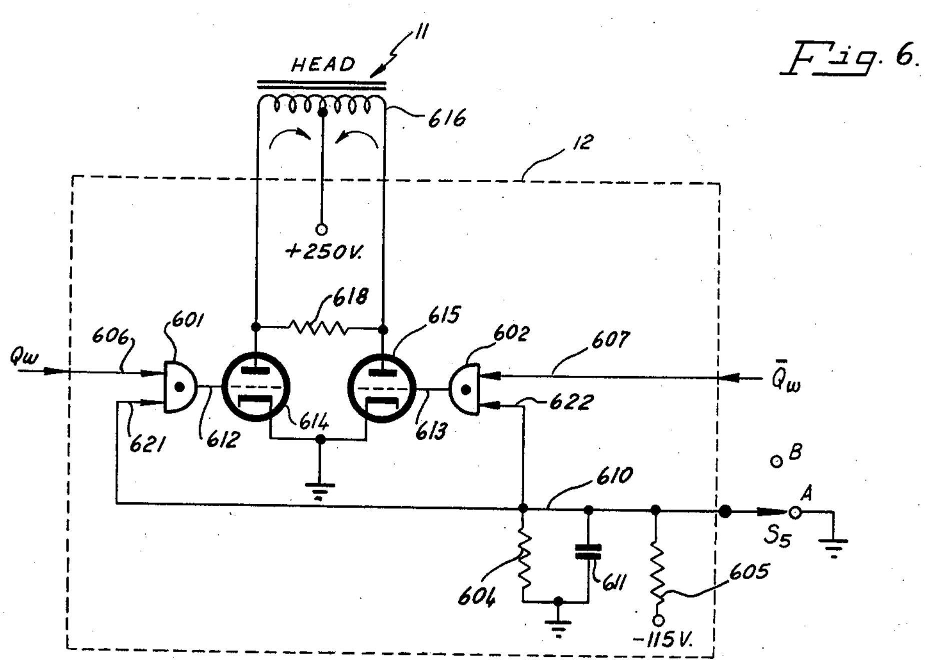
Figure 7:
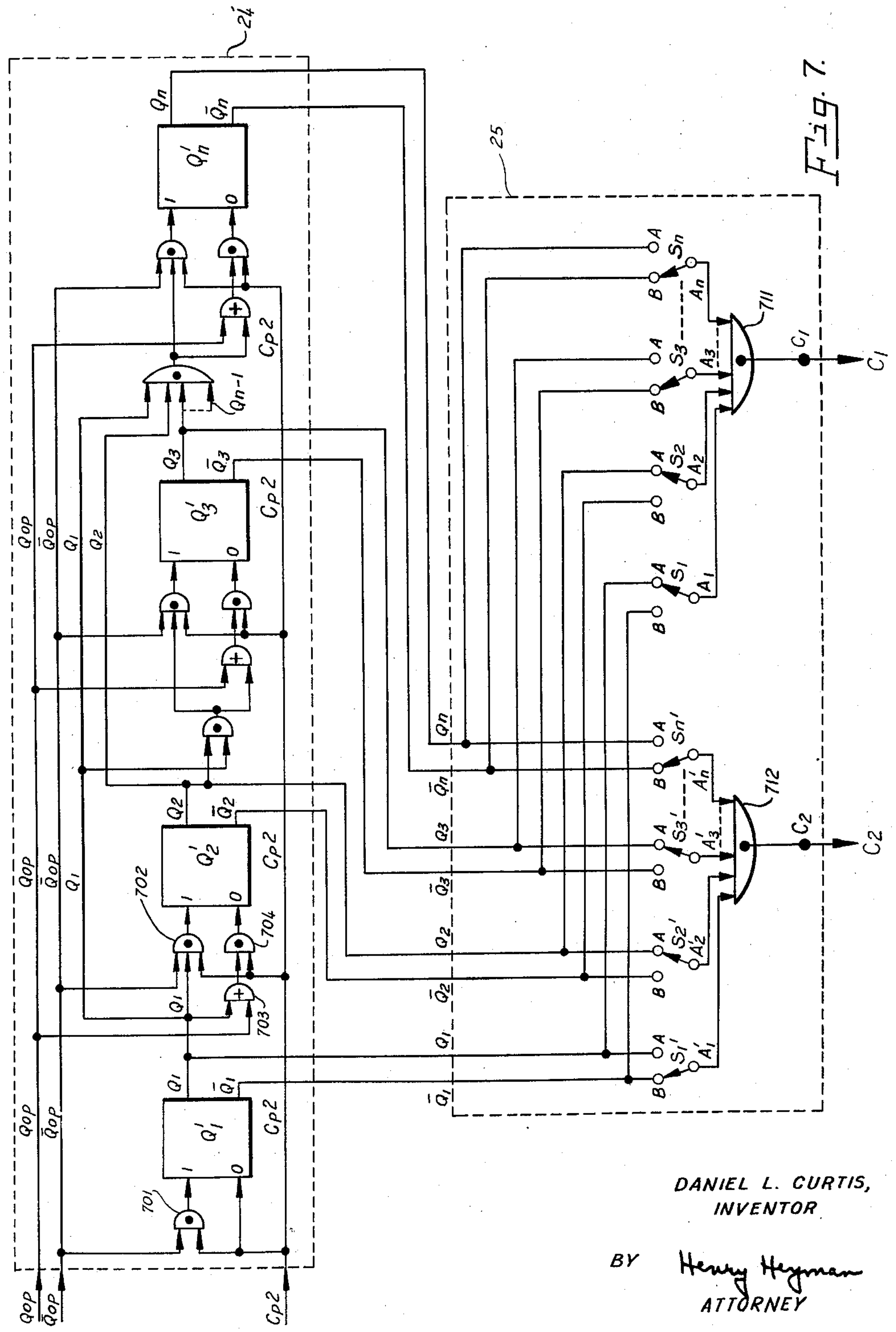

Figs. 3*a* and 3*b* illustrate the configuration of the image appearing on the face of the oscilloscope included in the system of Fig. 1 when the number of clock pulses recorded on the timing track of the drum is greater than and less than the desired number of clock pulse signals;

Fig. 4 is a schematic circuit diagram illustrating the detail structure of the complementary pulse forming circuit shown in block form in Fig. 1;

Fig. 5 is a detailed schematic circuit diagram of the gate circuit illustrated in block form in Fig. 1;

Fig. 6 is a schematic circuit diagram of the clock writing circuit illustrated in block form in Fig. 1; and Fig. 7 is a schematic circuit diagram, partially in block form, illustrating tin greater detail the counter and the count selection circuit of Fig. 1.

Reference is now made to Fig. 1 wherein there is presented in schematic block form a timing track recording system in accordance with the present invention adapted for accurately recording a timing track 10 of any desired number of clock pulse signals around the periphery of a magnetic memory drum 1 continuously rotating in the direction, indicated by an arrow, by a driving source not shown. The signals recorded on timing track 10 of drum 1 originate in the form of sine wave signals $S_{ws}$ produced by a variable frequency oscillator (VFO) 20 which are impressed on an amplifier and squaring circuit 21 through switch $S_1$ which is normally in the A position as illustrated. The output signals $S_w$ of amplifier and squaring circuit 21 are substantially square wave signals having a frequency or repetition rate coincident with the sine wave signals impressed thereon. Square wave signals $S_w$ are simultaneously impressed on the input circuits of a complementary pulse forming circuit 22 and a pulse forming circuit 23. In response to signals $S_w$, complementary pulse forming circuit 22 simultaneously produces a positive and a negative triggering pulse $C_{p1}$ and $C_{p2}$ on output terminals P1 and P2, respectively, for each cycle of square wave signals $S_w$, each complementary pair of pulses $C_{p1}$, $C_{p2}$ being produced in time coincidence with the leading edge of the positive half-cycle of a corresponding square wave signal $S_w$. Simultaneously, pulse forming circuit 23 produces a series of negative triggering pulse $C_{p3}$ corresponding to the trailing edge of each positive half-cycle of square wave signals $S_w$ impressed thereon.

Negative triggering pulses $C_{p2}$, $C_{p3}$ occurring successively during each cycle of signals $S_w$ are impressed on the 1 and the 0 input circuits, respectively, of a bistable flip-flop $Q_w'$. In response to negative pulses $C_{p2}$ and $C_{p3}$ impressed thereon, flip-flop $Q_w'$ produces complementary binary or two-level voltage signals $Q_w$, $\bar{Q}_w$ which may both be impressed on clock writing circuit 12 as is conventional. Clock writing circuit 12, in response to complementary signals $Q_w$ and $\bar{Q}_w$, develops current signals $C_p$ which are magnetically recorded on timing track 10 of drum 1 by magnetic writing head 11.

A switch $S_5$, illustrated in the A position, provides an external ground connection for writing circuit 12. When switch $S_5$ is in the B position, however, the external ground connection is broken. As will become apparent later on from the ensuing discussion, when it is desired to interrupt the recording of clock-pulse current signals $C_p$, switch $S_5$ is thrown to the B position. As a result, clock writing circuit 12 becomes gradually inoperative, in a manner to be shown, thereby avoiding introduction of transient signals on timing track 10 which could result from a sudden cessation of the clock-pulse current signals $C_p$.

Flip-flop $Q_w'$, similar to the remaining flip-flop circuits hereinafter discussed, is a conventional bistable flip-flop having 1 and 0 input circuits and producing complementary binary or two-level output signals $Q_w$ and $\bar{Q}_w$ representing the stable state of the flip-flop. More specifically, a flip-flop of this class is characterized by producing a relatively high-level $Q_w$ and a relatively low-level $\bar{Q}_w$ output signal when in one of its stable states, and a relatively low-level and high-level $Q_w$ and $\bar{Q}_w$ output signal, respectively, when in its other stable state. For convenience, a relatively high-level output signal of a flip-flop will hereinafter be referred to as a 1-level signal, and a relatively low-level output signal as a 0-level signal. Although the timing track recording system of the present invention is in no way so limited, it is herein assumed that a relatively high or 1-level voltage signal is a ground or zero potential signal, and that a relatively low or 0-level signal is a −15 volt signal. It is also convenient to consider one of the complementary output signals of a flip-flop as the "true" output signal of the flip-flop and the other output signal of the flip-flop as the "true-complement" output signal. In accordance with this convention, the true output signal is indicated by a symbol without a bar (‾) over the signal, and the true-complement output signal by the same symbol with the (‾). In order to avoid possible confusion, it should be understood at the outset that a binary signal or variable as herein used indicated by a symbol with a bar (‾) over the symbol indicates the complement of the signal or variable. More specifically, a binary signal represented by a symbol with a bar (‾) over the signal is at all times at the opposite voltage level as a signal represented by the same symbol without the bar (‾). Thus output signal $Q_w$ represents the true output signal and output signal $\bar{Q}_w$ the true-complement output signal of flip-flop $Q_w'$.

In order to provide terminology for identifying the stable states of a conventional bistable flip-flop of this class, the stable state of a flip-flop characterized by a 1-level true output signal will hereinafter be referred to arbitrarily as the 1-representing state, and the opposite state characterized by a 0-level true output signal will be referred to as the 0-representing state.

A conventional bistable flip-flop, such as $Q_w'$ of Fig. 1, is further characterized by assuming the 1-representing state in response to a pulse applied to the 1 input of the flip-flop, and conversely by assuming the 0-representing state when a pulse is applied to the 0 input of the flip-flop. Thus flip-flop $Q_w'$ will assume the 1-representing state in response to each $C_{p2}$ negative pulse and will assume the 0-representing state in response to each $C_{p3}$ negative pulse impressed thereon. Although not pertinent at this point since signals $C_{p2}$ and $C_{p3}$ correspond to the leading and trailing edges, respectively, of square wave signals $S_w$ and therefore never occur simultaneously, it should be understood that a flip-flop of this class is triggered to its opposite state, regardless of its previous state, when a pulse is simultaneously applied to both the 1 and 0 inputs of the flip-flop. Typical flip-flops of the above class are illustrated and described in detail in U.S. Patent No. 2,644,887, entitled "Synchronizing Generator," by A. E. Wolfe, Jr., issued July 7, 1953.

Having thus far described the variable frequency recording circuit of the timing track recording system illustrated in Fig. 1 comprised of VFO 20, amplifier and squaring circuit 21, complementary pulse forming circuit 22, pulse forming circuit 23, flip-flop $Q_w'$, clock writing circuit 12, and magnetic writing head 11, it is advantageous at this time to consider more closely the waveforms of the signals heretofore discussed before proceeding to the remaining portions of the system. Accordingly, reference is made to Fig. 2 wherein a waveform chart is presented illustrating the voltage wave shapes at various points in the timing track recording system of Fig. 1 plotted as a function of time.

Figure 2:
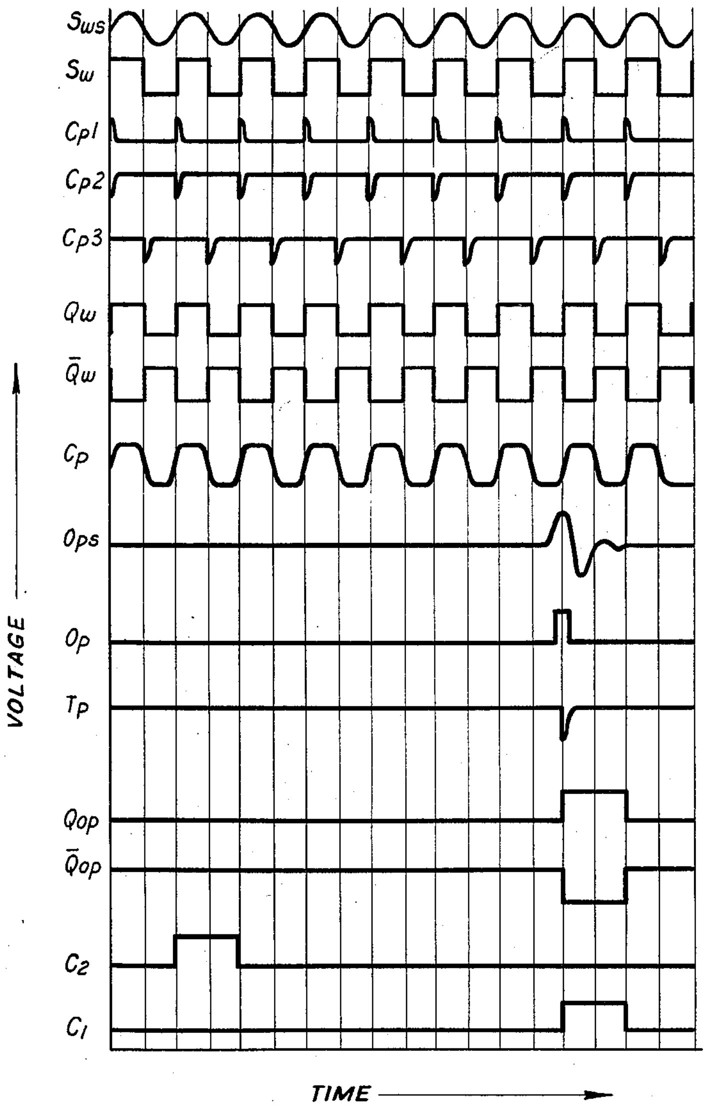
Fig. 2 is a chart of the voltage waveforms associated with specific portions of the timing track recording system illustrated in Fig. 1.

Each signal illustrated is identified by a symbol at the extreme left end of Fig. 2 which directly corresponds to the reference symbol utilized to identify the corresponding signal in Fig. 1. For example, sine wave signals $S_{ws}$ appearing at the output of VFO 20 of Fig. 1 are illustrated on line $S_{ws}$ of the wave chart. In like manner, the remaining signals illustrated in the wave chart are readily identifiable by reference to Fig. 1.

It is noted by an examination of the chart of Fig. 2 that each cycle of square wave signals $S_w$ coincides in time with a corresponding cycle of sine wave signals $S_w$. It is further noted that both a positive $C_{p1}$ pulse and a negative $C_{p2}$ pulse are produced by complementary pulse-forming circuit 22 during each cycle of square wave signals $S_w$ corresponding to the leading edge of each cycle. In contrast, a negative $C_{p3}$ pulse is produced by pulse-forming circuit 23 during each cycle of square wave signals $S_w$ coincident with the trailing edge of each cycle.

Since signals $C_{p2}$ and $C_{p3}$ are applied to the 1 and 0 inputs of flip-flop $Q_w'$, it is triggered to the 1-representing state by each $C_{p2}$ signal and triggered to the 0-representing state by each $C_{p3}$ signal. As a result, the true output voltage level signals $Q_w$ of the flip-flop, as illustrated in the voltage chart of Fig. 2, corresponding to signal $S_w$ are 1-level signals for each interval of time between a $C_{p2}$ signal and the immediately following $C_{p3}$ signal. Conversely, signals $\bar{Q}_w$ are 0-level signals for each interval of time between a $C_{p3}$ signal and the immediately succeeding $C_{p2}$ signal. The true-complement signals $\bar{Q}_w$ of flip-flop $Q_w'$ are shown in the wave chart as having at all times complementary values to signals $Q_w$. Clock pulse current signals $C_p$ have substantially the waveform indicated in the chart, this waveform having the proper characteristics for exciting writing head 11 to magnetically record on channel 10 of drum 1 clock pulses substantially identical to square wave signals $S_w$.

The circuit of Fig. 1 described thus far relates to that portion of the timing track recording system of the present invention for recording substantially rectangular clock pulses on timing track 10 of drum 1. Assuming that magnetic drum 1 is rotated at a substantially constant angular velocity, it is evident from the previous discussion, that the number of clock pulses recorded on drum 1 during any particular revolution of the drum will be directly dependent upon the relative frequency of the sine wave signals $S_{ws}$ produced by VFO 20 compared to the angular speed of the drum. It remains, therefore, to consider the elements of the timing track recording system of Fig. 1 which are utilized for determining when the frequency of signals $S_{ws}$ has been properly adjusted to produce the desired number of clock pulses with in-phase overlap on channel 10 of drum 1. At this time switch $S_5$ may be thrown to the B position for gradually interrupting the clock-pulse recording.

With reference to Fig. 1, it will be noted that in addition to switches $S_1$ and $S_5$ previously discussed, there are three further switches $S_2$, $S_3$ and $S_4$ in the circuit as will be more fully explained hereinafter. For convenience in the ensuing description, it will be assumed that all switches $S_1$ to $S_5$ inclusive are each in the A position shown in Fig. 1 unless specifically stated otherwise. As has been previously mentioned, the timing track recording system of the present invention is not only adapted for recording a timing track 10 on drum 1 of any desired number of clock pulses, but in addition is also adapted to determine the number of clock pulses and the nature of the phase overlap of a previously recorded timing track. To accomplish this latter function switches $S_1$ to $S_5$ are thrown to their respective B positions.

In order to time the operation of the remaining portions of the circuit of Fig. 1 with the rotation of drum 1, a drum revolution indicator is provided by magnetically recording a single pulse 31 on an origin pulse channel 26 of the drum. Pulse 31 is read by a magnetic reading head 27 which produces an origin pulse signal $O_{ps}$ once each revolution of drum 1. Origin pulse signals $O_{ps}$ are impressed on a reading amplifier and squaring circuit 28, similar to amplifier and squaring circuit 21, for amplifying and shaping signals $O_{ps}$ to produce a substantially rectangular origin pulse $O_p$ during each revolution of the drum.

Origin pulses $O_p$ and complementary pulses $C_{p1}$, $C_{p2}$, produced respectively by the drum revolution indicator and the variable frequency recording circuits previously described, are applied to a counting circuit comprised of a gate circuit 23*a*, a flip-flop $Q_{op}'$, a counter 24, and a count selection circuit 25. Positive pulses $C_{p1}$ and origin pulses $O_p$ are impressed on gate circuit 23*a* which also receives the true-complement output signals $\bar{Q}_{op}$ of flip-flop $Q_{op}'$. Gate circuit 23*a* selectively gates signals $C_{p1}$ to produce output signals $(C_{p1}.O_p.\bar{Q}_{op})$ hereinafter referred to as signals $T_p$ when, and only when, both signals $O_p$ and $\bar{Q}_{op}$ are simultaneously 1-level signals. It is apparent, therefore, that each $T_p$ signal is in reality a $C_{p1}$ signal which has been impressed on gate circuit 23*a* coincident with an origin pulse $O_p$ during its high or 1-level value, and with a 1-level $\bar{Q}_{op}$ signal. As a consequence, output signals $T_p$ are identified by the signals impressed on gate circuit 23*a*, where a dot (.) between each of the signals indicates a logical "and" function as utilized in conventional Boolean logic.

Signals $T_p$ produced by gate circuit 23*a*, and signals $C_{p2}$ produced by complementary pulse forming circuit 22 are impressed on the 1 and the 0 input circuits, respectively, of flip-flop $Q_{op}'$. Negative pulses $C_{p2}$ and output signals $Q_{op}$, $\bar{Q}_{op}$, of flip-flop $Q_{op}'$ are impressed on counter 24.

Counter 24 may be any conventional electronic counter with certain additional features, capable of counting negative pulses $C_{p2}$ impressed thereon and producing complementary pairs of binary or two level output signals $Q_1$, $\bar{Q}_1$; $Q_2$, $\bar{Q}_2$; $Q_3$, $\bar{Q}_3$; . . . $Q_n$, $\bar{Q}_n$ indicating the count contained in counter 24, in a true binary or a binary-coded numbering system. The additional features required of counter 24 are (1) that signals $C_{p2}$ be counted by the counter only during the time that signals $Q_{op}$ and $\bar{Q}_{op}$ are respectively 0-level and 1-level signals, and (2) that counter 24 be reset to zero whenever signals $Q_{op}$ and $\bar{Q}_{op}$ are respectively 1-level and 0-level signals. Thus counter 24 counts signals $C_{p2}$ when flip-flop $Q_{op}'$ is in the 0-representing state and is reset to zero whenever the flip-flop assumes the 1-representing state.

Count selection circuit 25 is coupled to counter 24 and responsive to count signals $Q_1$, $\bar{Q}_1$; to $Q_n$, $\bar{Q}_n$, produced by counter 24, for producing first and second count selection pulses $C_1$ and $C_2$ on its output terminals $C_1'$ and $C_2'$, respectively. More specifically, count selection circuit 25 may be preset to provide a first positive pulse $C_1$ on output terminal $C_1'$ at any desired count of counter 24, and in addition may also be preset to produce a second positive pulse $C_2$ on output terminal $C_2'$ at any second count of the counter.

In operation, the counting circuit of the timing track recording system of the present invention functions in the following manner. During each revolution of drum 1, flip-flop $Q_{op}'$ is normally maintained in the 0-representing state since signals $C_{p1}$ are blocked by gate circuit 23*a*, from appearing at the 1-input of the flip-flop and signals $C_{p2}$ are directly applied to the 0-input of the flip-flop. Accordingly, counter 24 counts pulses $C_{p2}$.

Once during each revolution of drum 1, when an origin pulse $O_p$ is applied to gate circuit 23*a*, a single $T_p$ signal is impressed on the 1-input of flip-flop $Q_{op}'$ coincident with a corresponding $C_{p2}$ signal impressed on the 0-input of the flip-flop. As a result, flip-flop $Q_{op}'$ is triggered to the opposite or 1-representing state. When this occurs, counter 24 is reset to zero. The immediately succeeding $C_{p2}$ pulse triggers flip-flop $Q_{op}'$ back to the 0-representing state in which state it again remains until the occurrence of the next origin pulse $O_p$. In this manner, counter 24 is made to begin counting the number of clock pulses being recorded on drum 1 during each revolution of the drum at exactly the same point in space around the periphery of the drum.

In operation, count selection circuit 25 is adjusted, by means to be explained later on, to produce a positive $C_1$ signal on terminal $C_1'$ whenever output signals $Q_1$, $\bar{Q}_2$ to $Q_n$, $\bar{Q}_n$ from counter 24 indicate that the number of clock pulses which it is desired to record on timing track 10 of drum 1 have been counted by the counter. Count selection circuit 25 is also adjusted to produce a positive $C_2$ signal on terminal $C_2'$ slightly in advance of each $C_1$ signal as an alert or warning signal (see Fig. 2).

For example, assume that it is desired to record 1,000 clock pulses on timing track 10 of drum 1. Count selection circuit 25 would then be adjusted to produce a $C_1$ signal on terminal $C_1'$ whenever signals $Q_1$, $\bar{Q}_1$ to $Q_n$, $\bar{Q}_n$ indicate that counter 24 has counted 1,000 $C_{p2}$ signals. In order to provide an alert or warning signal, selection circuit 25 would also be adjusted to produce a $C_2$ signal preceding in time each $C_1$ signal by a convenient period as for example at each count of 994 of counter 24.

From the preceeding discussion, it is apparent that flip-flop $Q_{op}'$ is triggered to the 1-representing state once each revolution of drum 1 by a positive $C_{p1}$ pulse occurring in time coincidence with an origin pulse $O_p$. It is further apparent that flip-flop $Q_{op}'$ will be triggered back to the 0-representing state by the immediately succeeding $C_{p2}$ pulse. The true output signal $Q_{op}$ of flip-flop $Q_{op}'$, therefore, is a 0-level signal at all times during each revolution of drum 1 except for a period of time corresponding to a single cycle of square wave signal $S_w$ occurring in time-coincidence with an origin pulse $O_p$. This is illustrated in Fig. 2 wherein it is noted that signal $Q_{op}$ has a 1-level value for a period commencing with pulse $(C_{p1}.O_p.\bar{Q}_{op})$ and ending with the succeeding $C_{p2}$ pulse. Conversely, the true-complement output signal $\bar{Q}_{op}$ of flip-flop $Q_{op}'$ has a 1-level value at all times during each revolution of drum 1, except for the above described period when it has a 0-level value.

As previously explained, signal $C_1$, produced by count selection circuit 25, has a 0-level value at all times during each revolution of drum 1 except for a period of time corresponding to one cycle of square wave signal $S_w$ indicating when, during the revolution of the drum, the desired number of clock pulses has been recorded on the timing track 10. Earlier in time during each revolution of drum 1, a 1-level $C_1$ signal is produced. Depending upon the setting of the count selection circuit 25, a predetermined number of cycles of signals $S_w$ separate the 1-level periods of signals $C_1$ and $C_2$ during each revolution of drum 1. For example, in Fig. 2 the 1-level period of signal $C_2$ is illustrated as occurring six cycles of signal S in advance of the 1-level period of signal $C_1$. For convenience in future discussion, the brief period during each revolution of drum 1 when a $Q_{op}$, a $C_1$, and a $C_2$ signal is a 1-level signal, it will hereinafter be referred to respectively as a positive $Q_{op}$, $C_1$, and $C_2$ pulse. In a similar manner, the brief period during each revolution of drum when $\bar{Q}_{op}$ signal is a 0-level signal will hereinafter be referred to as a negative $\bar{Q}_{op}$ pulse.

From the foregoing discussion, it is evident that either negative pulses $\bar{Q}_{op}$ or positive pulses $Q_{op}$ may be utilized as a reference indicating the instant each revolution of drum 1 begins. For this reason, signals $Q_{op}$, $\bar{Q}_{op}$ may be considered as revolution indicating signals, and gate circuit 23 and flip-flop $Q_{op}'$ as part of a drum revolution indicating circuit.

During each revolution of drum 1, on the other hand, a positive pulse $C_1$ indicates the exact moment during the revolution of the drum when the desired number of clock pulses has already been recorded on timing track 10. By comparing for coincidence during each revolution of the drum, therefore, either signal $Q_{op}$ or $\bar{Q}_{op}$ with signal $C_1$, it may be ascertained when the desired number of clock pulses has been recorded around the periphery of timing track 10 of drum 1 with in-phase overlap during the preceding revolution of the drum.

In the embodiment illustrated in Fig. 1, an oscilloscope 30 is utilized for determining when the above discussed coincidence has occurred. In furtherance of this objective, positive pulses $C_1$, produced by count selection circuit 25, are applied to the Y-axis of oscilloscope 30 by way of terminal Y. The internal X-axis sweep-circuit of oscilloscope 30 is then adjusted to produce a convenient-sized image 33 of positive pulses $C_1$ on the face of cathode ray tube CRT of the oscilloscope. Positive pulses $C_2$ are then applied through switch $S_3$ to the triggering terminal T of the internal X-axis sweeping circuit of the oscilloscope in order to insure that image 33 of signal $C_1$ will occupy the same position on the face of tube CRT during each revolution of drum 1. Negative pulses $\bar{Q}_{op}$ are applied to the cathode circuit of the tube CRT of oscilloscope 30 by way of terminal Z, the cathode connection to the tube CRT being commonly referred to as a connection for the Z-axis of the scope. To those skilled in the art, it will be evident that each negative pulse $\bar{Q}_{op}$ impressed on the Z axis of tube CRT will cause a momentary decrease in the cathode potential thereby causing a corresponding momentary increase in intensity producing an intensified spot 32 on trace or image 33.

If the number of clock pulses recorded on timing track 10 of drum 1 exceeds the desired number of pulses, to which count selection circuit 25 has been pre-set, a positive pulse $C_1$ will occur in advance of a negative $\bar{Q}_{op}$ pulse during each revolution of the drum. When this occurs, the intensified spot 32 will not be centered as illustrated in Fig. 1, but will occur after the image 33 of pulse $C_1$ as illustrated in Fig. 3*a*. Conversely, if the number of count pulses recorded on timing track 10 of drum 1 is less than the desired number of clock pulses, a negative $\bar{Q}_{op}$ pulse will occur before a positive pulse $C_1$ is produced during each revolution of the drum. As a result, counter 24 is reset to zero during each revolution of the drum before the counter has a sufficient count to produce a $C_1$ signal. Consequently, the intensity spot 32 will occur on the left edge of the trace as illustrated in Fig. 3*b*, wherein no reproduced image of a $C_1$ pulse is produced. If the exact number of desired clock pulses is recorded on timing track 10 of drum 1 during each revolution of the drum, however, negative pulses $\bar{Q}_{op}$ and positive pulses $C_1$ occur in exact time coincidence, i.e., exactly the same time during each revolution of the drum. When this occurs, intensity spot 32 will occur at the exact center of the reproduced image 33 of positive pulses $C_1$ during each revolution of the drum, as indicated in Fig. 1.

The position of intensity spot 32 with respect to the reproduced image 33 of positive pulses $C_1$ may be varied by altering the frequency of sine wave signals $S_{ws}$ thereby altering the repetition rate of clock pulses $C_p$. For example, if intensity spot 32 occurs to the right of image 32, as is illustrated in Fig. 3*a*, the spot may be moved to the left by decreasing the frequency of signals $S_w$. With equal ease, when spot 32 appears on the left edge of the trace CRT 31, as illustrated in Fig. 3*b*, the spot may be gradually shifted toward the right by correspondingly increasing the frequency of signal $S_w$. In this manner the position of intensity spot 32 with relation to pulse trace 33 may be adjusted by adjusting correspondingly the frequency of signals $S_s$ until the exact desired coincidence illustrated in Fig. 1 has been achieved. If the recording of clock pulses $C_p$ is interrupted at this time, by throwing switch $S_5$ from the A to the B position, the desired timing track 10 is preserved on drum 1.

Having explained the operation of the system of the present invention illustrated in Fig. 1 for recording a timing track 10 of a desired number of clock pulses with in-phase overlap, the procedure employed for utilizing the recording system of Fig. 1 to check a timing track previously recorded will now be explained. To perform this function, the contacts of all switches $S_1$ to $S_5$ are thrown to the respective B contact positions. When this is done it will be noted that variable frequency oscillator 20 is disconnected from the remaining portion of the circuit. The signals formerly applied to the input of amplifier and squaring circuit 21 from oscillator circuit 20 are now supplied from a magnetic reading head 35 positioned above timing track 10 and producing electrical signals corresponding to the previously recorded clock pulses. Thus, the signals previously recorded on timing track 10 are now amplified and squared by amplifier and squaring circuit 21 to form signals $S_w$. Signals $S_w$, as before, are simultaneously applied to complementary pulse forming circuit 22 and pulse forming circuit 23, the outputs of which are respectively applied to the 1 and 0 inputs of flip-flop $Q_w'$ producing output signals $Q_w$ and $\bar{Q}_w$ which are applied to clock writing circuit 12. However, since switch $S_5$ is now in the B position, clock writing circuit 12 is inoperative for reasons more fully explained later on.

Since switch $S_2$ is now in the B position, output signals $T_p$, produced by gate circuit 23*a*, are isolated from the remaining circuit and are, therefore, ineffective during the checking operation. It is, accordingly, evident that the only signals produced by the recording portion of the system of Fig. 1 which are effective in the remaining circuit are signals $C_{p2}$ which are simultaneously applied to counter 24 and the 0 input of flip-flop $Q_{op}'$. It will be observed that since switch $S_2$ is in the B position, signals $C_1$ produced by count selection circuit 25 are now applied to the 1 input of flip-flop $Q_{op}'$ as well as to terminal Y of oscilloscope 30. Signals $C_2$, produced by count selection circuit 25, are isolated from the remaining circuits and origin pulse signals $O_p$ are now applied through the B contact of switch $S_3$ to the trigger terminal T of oscilloscope 30. Oscilloscope 30 is therefore triggered once during each revolution of the drum by origin pulses $O_p$.

Counter 24 now recycles on the count representing the desired number of clock pulses. This is readily understood when it is remembered that counter 24 is reset whenever flip-flop $Q_{op}'$ is in its 1-representing state; flip-flop $Q_{op}'$ being now set to its 1-representing state by signal $C_1$ applied through switch $S_2$. The intensification terminal Z of oscilloscope 30 now receives negative signals $C_{p2}$ through contact B of switch $S_4$ connected to the $P_2$ output of complementary pulse forming circuit 22 as indicated. Summarizing, therefore, trace 33 of oscilloscope 30 is a reproduction of signals $C_1$ as before. Counter 24 is reset upon each completion of a count representing the desired number of count pulse signals, as preset in count selection circuit 25. The intensification spot 32 is now generated by negative going pulses $C_{p2}$ which are generated for each clock pulse signal recorded on timing track 10.

It is apparent, therefore, that since origin pulses $O_p$ are impressed on the horizontal trigger terminal T of oscilloscope 30 and signals $C_1$, produced by count selection circuit 25, are impressed on terminal Y of the oscilloscope, image 33 of pulse $C_1$ will be stationary if the desired number of clock pulses has been recorded on timing track 10 of drum 1. If the number of clock pulses recorded on the timing track is in excess of the desired number of clock pulses as pre-set by count selection circuit 25, then the repetition rate of signal pulses $C_1$ will be in excess of the repetition rate of origin pulses $O_p$. As a consequence, image 33 of pulse $C_1$ will occur earlier in time during each revolution of drum 1 as compared to pulses $O_p$, thus causing image 33 to appear to shift across the face of CRT 31 from right to left. In other words, the oscilloscope will appear to be out of synchronism. On the other hand, if the number of clock pulses recorded on timing track 10 is less than the desired number of clock pulses, signals $O_p$ will have a repetition rate greater than the repetition rate of signal $C_1$. Hence, image 33 will again shift but from left to right.

It is often desired to determine exactly the number of clock pulses previously recorded on timing track 10 when the number recorded is different from the desired number of clock pulses as determined by the above described test. This knowledge is often useful in determining a source of error in the recording process, as for example, in determining the quantity of error introduced in the recording process by a gradual shifting of frequency of the variable frequency oscillator 20, or a varying angular velocity of rotation of drum 1. Thus, in checking the correctness of a previously recorded timing track on drum 1, if it is found that image 33 of oscilloscope 30 is non-stationary by the above outlined procedure, the exact number of clock pulses recorded on timing track 10 is determined by the following process.

With switches $S_1$ to $S_5$ in their B positions, count selection circuit 25 is pre-set to produce a $C_1$ pulse on each second count of counter 24. It is then observed if a stationary image is produced on the face of tube CRT. From the previous discussion, it is apparent that if a stationary image is produced, this indicates that the number 2 is a primary factor of the number of clock pulses previously recorded on timing track 10. If the image appearing on the face of the tube CRT is still transient, count selection circuit 25 is set to produce a $C_1$ pulse on each third count, and so on, repeating the process until a first prime factor of the number of clock pulses recorded on the timing track is found. When a first prime factor has been found by the above procedure, i.e., when a stationary image is obtained on the face of the tube CRT, a second prime factor is then determined by successively increasing the setting of count selection circuit 25 by one unit until a second setting of count selection circuit 25 is found for producing a stationary image on the face of the tube CRT. The above process is repeated until all single decimal digit prime factors are determined. Count selection circuit 25 is then pre-set to various products of the prime factors representing values relatively near the number of desired clock pulses until a stationary image on the face of the tube CRT is obtained. Count selection circuit 25 is then successively set at a slightly lower and a slightly higher count to determine if the pulse images produced appear to shift respectively towards the right and towards the left edge of the face of tube CRT. If this occurs, the number of clock pulses recorded on the drum is then known as equal to the last stationary image setting of count selection circuit 25.

An example may be utilized to further clarify the checking procedure for determining the number of clock pulses which has been recorded on timing track 10. Assume that it is desired to record exactly 1000 clock pulses on the timing track. Further assume that actually 980 clock pulses have been recorded. With switches $S_1$ to $S_5$ thrown to their B positions, and count selection circuit 25 set to produce a $C_1$ pulse at each 1000th count of counter 24, the preliminary check for the accuracy of the timing track 10 is followed. Since the actual number of pulses recorded on timing track 10 is 980, whereas count selection circuit 25 produces a $C_1$ pulse every 1000th clock pulse, image 33 will not be stationary. In contrast, the oscilloscope 30 will apear to be out of synchronism, that is, the image will appear to drift from right to left. At this point, therefore, it is known that the actual number of clock pulses recorded on timing track 10 of drum 1 is less than the required number of clock pulses for which count selection circuit 25 is set.

The prime factors of the number of clock pulses actually recorded are then checked. To this end, count selection circuit 25 is set to produce a $C_1$ pulse for every second count of counter 24. Since there are actually 980 clock pulses recorded on the timing track, a stationary image will be observed. In order to check the operation of the count selection circuit 25 and counter 24 at this point, the internal sweep circuit is expanded sufficiently to clearly oberve two succeeding pulse images on the face of the tube CRT. The number of intensification spots, produced by application of signals $C_{p2}$ on the Z terminal of oscilloscope 30, are then counted between two succeeding pulse images. If the number of intensity spots is 2, thereby agreeing with the setting of the count selection circuit 25, it is known that the combination of counter 24 and count selection circuit 25 are operating satisfactorily.

Proceeding in the above-described manner, other prime factors of the number of clock pulses actually recorded on the timing track are then obtained by selectively setting count selection circuit successively to higher values. In this manner it is determined that the prime factors of 2, 4, 5 and 7 produce stationary images on the face of CRT 31.

Count selection circuit 25 is then set for the product of the determined prime factors, in this instance 140. If a stationary image has been obtained on the face of tube CRT, it is determined that 140 is a factor. Then, 140 is successively multiplied by each of the prime factors 2, 4, 5 and 7, count selection circuit 25 being set for each product to determine the presence or absence of a stationary image on the face of tube CRT. It is found that only the product of factors 7 and 140 produce a stationary image. As a result count selection circuit 25 is set at 980. When a stationary image on the face of tube CRT is now obtained, it may be presumed that 980 represents the correct number of clock pulses actually recorded on timing track 10, since the total number desired was 1000, very nearly the same figure. However, as a further check to see if 980 is the exact amount recorded, count selection circuit 25 is successively set at 979 and 981 to observe if the pulse image observed on the face of tube CRT shifts gradually to the left and then to the right. If this occurs it is positively known that 980 represents the actual number of clock pulses recorded on timing track 10.

As has been previously explained, and as is well known to those skilled in the art, many of the components utilized in the system of Fig. 1 are conventional electronic components well known in the art. Specifically, variable frequency oscillators, amplifiers and squaring circuits, pulse-forming circuits, reading amplifier and squaring circuits, oscilloscopes having Y, T, and Z terminals, bistable flip-flops, and magnetic reading and writing heads are well known in the art. Further detailed consideration of the structure of these circuits, therefore, is obviously unnecessary. However, the structure of complementary pulse-forming circuit 22, gate circuit 23*a*, clock writing circuit 12, and counter 24 and count selection circuit 25 remains to be considered in more detail.

Reference is now made to Fig. 4 illustrating in detail the complementary pulse forming circuit 22 of Fig. 1. Complementary pulse forming circuit 22, enclosed by dotted lines, is responsive to input signals $S_w$ for producing complementary pulses $C_{p1}$ and $C_{p2}$ on output terminals $P_1$ and $P_2$, respectively.

Essentially, complementary pulse forming circuit 22 is a modified conventional blocking oscillator for producing very narrow sharp pulses in response to wide input pulses.

Signals $S_w$ are applied to the grid of a first triode 400 through a coupling capacitor 401. The anode and cathode of triode 400 are connected, respectively, to the anode and cathode of a second triode 403. The cathodes of both triodes 400 and 403 are directly connected to ground. A −15 volt reference potential is supplied to the grid of triode 400 through a grid leak resistor 402 thereby maintaining triode 400 below cut-off in the absence of a signal at the grid. The anodes of both triodes 400, 403 are connected to the lower terminal of a first winding $W_1$ of a transformer $T_1$. The upper terminal of winding $W_1$ is connected to a +180 volt supply through a current-limiting resistor 404. In addition, a filter capacitor 419 is provided between the upper terminal of winding $W_1$ and ground.

A regenerative feedback circuit is provided by a second winding $W_2$ of transformer $T_1$, the lower terminal of which is connected to the control grid of triode 403 through a current-limiting resistor 406. The grid of triode 403 is also connected to a −15 volt source through a potentiometer 405, the adjustable tap of which is directly connected to output terminal $P_1$. The upper extremity of winding $W_2$ is connected to a −15 volt source through a resistor 408 and to ground through a filter capacitor 418, resistor 408 and capacitor 418 together forming an A.C. bypass filter for winding $W_2$.

In parallel with winding $W_2$ there is provided an anti-ringing circuit or unidirectional current bypass circuit consisting of a resistor 415 and a diode 416 in series. In accordance with the conventions used throughout the present description, diode 416 is symbolized by an arrowhead and a line segment perpendicular to the arrowhead, the arrowhead symbolizing the anode of the diode and the line segment signifying the cathode.

In accordance with the operation of conventional blocking oscillators, a positive signal appearing at the grid of triode 400, which is of sufficient magnitude to overcome the negative bias of the triode, causes the triode to conduct. Momentary conduction of triode 400 causes a corresponding current signal in transformer winding $W_1$. The current signal in winding $W_1$ induces a voltage signal across winding $W_2$ due to the inductive coupling of the windings. The voltage signal appearing across winding $W_2$ is in phase with the positive signal impressed on the grid of triode 400 thereby producing a positive or regenerative feed-back voltage on the control grid of triode 403, thereby causing the current in winding $W_1$ to be further increased. As a result there is a rapid rise of the anode current of triode 403 until the anode current of the triode reaches saturation.

Positive half-cycles of signals $S_w$, appearing at the grid of triode 400, therefore, cause corresponding positive narrow pulses to be developed at the grid of triode 403, wherein each positive pulse corresponds to the leading edge of a corresponding cycle of signals $S_w$. These positive pulses, which are referenced to −15 volts, are applied to terminal $P_1$ as signals $C_{p1}$ through potentiometer 405. Since triode 400 is maintained below cut-off in the absence of a signal on the grid of the triode, it is obvious that the negative half-cycles of signals $S_w$ are ineffective.

Voltage signals corresponding to the voltage signals developed across winding $W_2$ are also developed across a third winding $W_3$ of the transformer. Winding $W_3$ is provided for supplying output signals in phase with the signals developed across winding $W_2$ but isolated therefrom in order to avoid excessive loading of winding $W_2$ and to permit the use of a different reference voltage for each signal source. The lower terminal of winding $W_3$ is directly grounded whereas the upper extremity of the winding is supplied from a −35 volt potential source through a clamping diode 412 and a current limiting resistor 411. Thus the negative pulses generated at the upper extremity of winding $W_3$ are referenced to ground potential and clamped or clipped off at a maximum negative value of −35 volts.

In Fig. 4 corresponding in-phase terminal ends of the windings of a transformer are indicated by a dot at the corresponding ends of the windings. The lower end of winding $W_1$ is an in-phase terminal point with the upper ends of winding $W_2$ and $W_3$ of the transformer. Summarizing, therefore, negative voltage pulses corresponding to the leading edge of the cycles of rectangular voltage signals $S_w$ are developed at the lower extremity of winding $W_1$. Corresponding positive voltage pulses are developed at the lower extremity of winding $W_2$ and corresponding negative pulses are developed at the upper extremity of winding $W_3$.

The negative pulses appearing at the upper extremity of winding $W_3$ which are referenced at ground potential and clipped at −35 volts, are applied to the primary winding $W_4$ of a stepdown transformer $T_2$, the lower terminal of winding $W_4$ being grounded. The corresponding negative pulses appearing at the upper extremity of the secondary winding $W_5$ of transformer $T_2$, are fed to output terminal $P_2$ and thus constitute the negative output pulses $C_{p2}$. In order to avoid ringing, a shunting path for possible positive pulses appearing across winding $W_5$ is provided by a resistor 420 and a diode 421 connected in series across winding $W_5$ as indicated, the junction of diode 419 and winding $W_5$ being grounded.

Fig. 5 illustrates in detail the electronic gate circuit **23*a*, enclosed by dotted lines, suitable for operation in the system of Fig. 1. Origin pulses $O_p$ are coupled, by a coupling capacitor 500 to the anode lead 504 of a coupling diode 501. Anode lead 504 is also connected to a −115 volt supply through a pull-down resistor 502. A clamping diode 503 connects lead 504 to a −15 volt supply. As a result, the potential on lead 504 is pulled down toward a −115 volt level but is not permitted to rise above −15 volt level, i.e., is clamped at −15 volts, by the action of clamping diode 503. Signals $O_p$, appearing on lead 504**, are therefore referenced at a −15 volt level.

Cathode lead 505 of coupling diode 501 is directly connected to the suppressor grid of a pentode tube 506. Lead 505, similar to lead 504, is coupled through a pull-down resistor 512 to a −115 volt supply. The potential level of lead 505 in the absence of an $O_p$ signal, however, is maintained at a −15 volt level by the clamping action of clamping diode 503 operating through coupling diode 501. More specifically, when the potential level of lead 505 attempts to fall below −15 volts by virtue of the −115 volt supply through pull down resistor 512, diodes 501 and 503 in series immediately cause conduction of current through a circuit path from the −115 volt supply through resistor 512, diodes 501 and 503 and to the −15 volt supply until the voltage drop across resistor 512 is sufficient to raise the voltage level of lead 505 to −15 volts.

The true-complement output signal $\bar{Q}_{op}$ from flip-flop $Q_{op}'$ of Fig. 1 is applied, through a pull-down diode 507, to lead 505. From the previous discussion with reference to Figs. 1 and 2, it will be remembered that signals $\bar{Q}_{op}$ are normally 1-level or ground potential signals except during a single clock pulse period of each revolution of drum 1 corresponding to an origin pulse $O_p$, at which time signal $\bar{Q}_{op}$ assumes a 0-level or −15 volt value as indicated in Fig. 5. Normally, therefore, lead 505 being clamped at −15 volts or above, and signal $\bar{Q}_{op}$ having a ground potential level, diode 507 is back biased. As a result an $O_p$ signal, appearing on lead 505 is clipped at ground potential, because any rise above ground potential will cause diode 507 to conduct.

Signals $O_p$, appearing on lead 505, therefore have a lower limit of −15 volts and an upper limit of 0 volts or ground potential. On the other hand, when signal $\bar{Q}_{op}$ has a 0-level value or −15 volt value and lead 505 is at ground potential due to the presence of an $O_p$ signal, diode 507 is forward-biased thereby drawing current and rapidly pulling the potential on lead 505 down to a −15 volt value. A charging capacitor 510 and a grid leak resistor 511 are also connected between lead 505 and ground, the purposes of which are explained later on.

Signals $C_{p1}$ are directly applied to the control grid of pentode 506 from terminal $P_1$ of the complementary pulse forming circuit 22 of Fig. 4. The cathode of pentode 506 is connected through a cathode resistor 513 to ground, and the anode of the tube is connected through a plate load resistor 514 to a 100 volt supply. The screen grid of the pentode is maintained at +100 volts by a direct connection to the supply potential.

The values for cathode resistor 513 and plate resistor 514 are chosen to cause pentode 506 to be non-conductive so long as the suppressor grid of the tube is maintained at its −15 volt level irrespective of the presence of a positive $C_{p1}$ signal on the control grid of the tube. In other words, in the absence of an origin pulse $O_p$ on the lead 505, signals $C_{p1}$ are ineffective to cause conduction of pentode 506. When the potential level of the suppressor grid is raised from its −15 volt reference level to ground potential due to the presence of an origin pulse $O_p$ on lead 505, however, positive pulses $C_{p1}$ are effective to cause conduction of the pentode. As a result, negative pulse signals corresponding to the applied $C_{p1}$ pulses are developed at the anode of pentode 506. Thus pentode 506 operates as a coincidence gate tube inverting and amplifying signals $C_{p1}$ applied thereto only when coincident with applied $O_p$ signals.

In order to insure coincidence between an origin pulse $O_p$ and a positive $C_{p1}$ pulse, each $O_p$ pulse appearing on lead 505 is stretched or lengthened beyond its natural duration by an RC time constant circuit comprised of capacitor 510 and resistors 511, 512. A −15 volt potential charge appears across charging capacitor 510 in the absence of an $O_p$ signal. This charge is rapidly discharged through diode 501 when an $O_p$ signal is present on lead 505 due to the forward bias of the diode 501. As the potential level on lead 505 tends to return to the −15 volt reference level, however, capacitor 510 must be recharged to a −15 volt potential by current passing through resistor 512 from the −115 volt supply. This current is divided between capacitor 510 and resistor 511. As a result the duration of each $O_p$ pulse appearing on lead 505 as shown in Fig. 5 is increased proportionally to the time constant of the time-constant circuit comprised of capacitor 510 and resistors 511 and 512.

In order, however, to prevent the duration of an $O_p$ pulse on lead 505 to extend over two consecutive $C_{p1}$ pulses, the potential level on lead 505 is rapidly pulled down to the −15 volt reference level by signal $\bar{Q}_{op}$ through pull-down diode 507 once a coincidence between an origin pulse and a single $C_{p1}$ pulse has occurred. Referring briefly to Figs. 1 and 2, it is noted that once a $T_p$ pulse is generated, representing coincidence between an origin pulse $O_p$ and a single $C_{p1}$ signal, flip-flop $Q_{op}'$ is immediately triggered to the 1-representing state. As a result the true-complement output signal $\bar{Q}_{op}$ of the flip-flop changes from a 1-level to a 0-level signal; i.e., from ground potential to −15 volts. The potential level of lead 505 is accordingly rapidly reduced to its −15 volt reference level.

The negative signals appearing at the anode of pentode 506, which corresponds to positive input $C_{p1}$ signals occurring coincident in time to origin pulses $O_p$, are applied to the control grid of a second pentode 518 through a coupling capacitor 515. The control grid of pentode 518 is normally maintained at ground potential by a diode 516 connected between the grid and ground and a pull-up circuit comprised of a resistor 517 connected between the grid and a +100 volt supply. The pull-up circuit of the grid has the added purpose of rapidly pulling the control grid back up to ground potential immediately after each negative pulse applied thereto. Pentode 518 is connected in the circuit as a conventional triode cathode follower having its anode and its screen and suppressor grids connected directly to a +100 volt supply, and its cathode connected to a −115 volt source through a cathode load resistor 519. The low impedance negative output pulses $T_p$ of the cathode follower circuit are clamped between maximum values of ground and −15 volts by a ground clamping diode 521 and a −15 volt clamping diode 520.

Fig. 6 illustrates in detail the clock writing circuit 12 of Fig. 1. Clock writing circuit 12, enclosed by dotted lines in Fig. 6, is responsive to output signals $Q_w$ and $\bar{Q}_w$ of flip-flop $Q_w'$ of Fig. 1 for producing current signals in recording head 11 having the characteristics for recording substantially rectangular clock pulses on timing track 10 of drum 1. Signals $Q_w$ are applied to a first input lead 606 of a logical "and" circuit 601 and signals $\bar{Q}_w$ are applied to a first input lead 607 of a second logical "and" circuit 602, each logical "and" circuit being indicated in the figure symbolically by a semicircle with a dot (.). Logical "and" circuits 601 and 602 are conventional "and" circuits well known in the art having two or more inputs and a single output and operative to produce a 1-level output signal on its output when and only when all inputs are simultaneously supplied with 1-level input signals. Conversely, a logical "and" circuit of this class produces a 0-level output signal whenever any one or more of the inputs are supplied with a 0-level signal. Typical logical "and" circuits of this class are described and illustrated in detail on pages 37–45 of "High Speed-Computing Devices" by Engineering Research Associates, published in 1950 by McGraw-Hill Book Company, New York and London; and on pages 511–514 of an article entitled "Diode Coincidence and Mixing Circuits in Digital Computers" by Tung Chang Chen in the "Proceedings of the IRE," volume 38, May 1950.

Each of the logical "and" circuits 601 and 602 is provided with a second input lead 621 and 622, respectively, which is directly connected to a common lead 610 of switch $S_5$. Lead 610 is coupled to ground by a resistor 604 and a capacitor 611 in parallel. In addition, lead 610 is connected to a −115 volt source by resistor 605. It is apparent, therefore, that when switch $S_5$ is in the A position, lead 610 is at ground potential by a direct connection thereto. Remembering that ground potential represents a 1-level potential in the present system, whereas −15 volts corresponds to a 0-level potential, inputs 621, 622 of logical "and" circuits 601, 602 are provided with a 1-level potential or signal so long as switch $S_5$ is in the A position. When switch $S_5$ is in the A position, therefore, signals $Q_w$ and $\bar{Q}_w$, impressed on inputs 606 and 607 appear at the outputs 612 and 613, respectively, of the logical "and" circuits 601 and 602.

The output signals of logical "and" circuits 601, 602 appearing on output leads 612, 613 are directly applied to the individual control grids of triodes 614, 615. The cathodes of both triodes 614 and 615 are connected to ground and the anodes of the triodes are respectively connected to the terminals of a single center-tapped winding 616 of head 11. The center tap of winding 616 is returned to a +250 volt supply as shown. A bleeder resistor 618 is connected between the anodes of triodes 614, 615 in order to stabilize the recording circuit.

In operation recording circuit 12 functions in the following manner. When switch $S_5$ is in the A position, signals $Q_w$ and $\bar{Q}_w$ are applied through logical "and" circuits 601 and 602 to the grids of triodes 614 and 615. This occurs because lead 610 is maintained at ground potential, i.e., at the 1-level value. At this time a steady current is drawn from the −115 volt source through resistor 605 and through switch $S_5$ to ground.

By momentary reference to Fig. 2 and from the previous discussion, it is apparent that signals $Q_W$ and $\bar{Q}_W$ are complementary, i.e., when signals $Q_W$ are 1-level signals, signals $\bar{Q}_W$ are 0-level signals and conversely signals $\bar{Q}_W$ are 1-level signals when signals $Q_W$ are 0-level signals. The circuitry associated with triodes 614 and 615 is such that each triode is cut-off when the signal at its grid is a 0-level or −15 volt signal. When the signal at the grid of a triode is a 1-level or ground potential signal, however, the triode causes current to flow through its corresponding half of winding 616 in the direction indicated by the arrows. Thus when signal $Q_W$ is a 1-level signal, current flows through the left-hand half of winding 616 in the direction indicated, and when signal $\bar{Q}_W$ is a 1-level signal current flows through the right-hand half of the winding as indicated by a corresponding arrow. Consequently, current alternately flows through winding 11 in two opposite directions, one direction corresponding to 1-level values of signals $Q_W$, and in the opposite direction corresponding to 0-level values of signals $Q_W$ or which amounts to the same thing, 1-level value for signals $\bar{Q}_W$.

With switch $S_5$ in the B position, the current previously drawn through resistor 605 from the −115 volt source to ground now returns to ground through resistor 604. Resistors 604 and 605 form a series voltage divider between ground and the −115 volt source, values for these resistors being chosen to maintain lead 610 at a suitable negative value to cause logical "and" circuits 601, 602 to cut off or isolate signals $Q_W$, $\bar{Q}_W$ from the grids of triodes 614, 615. In order to enable the potential on lead 610 to drop from ground to the predetermined negative potential, however, capacitor 611 must be charged by a portion of the current flowing through resistor 605. Thus resistor 605 in series with resistor 604 and capacitor 611 in parallel form an RC time constant circuit causing the potential on lead 610 to drop when switch $S_5$ is put into the B position. This causes the signals appearing on leads 612 and 613 to be gradually reduced in amplitude. In this manner, the recording current of head 11 is gradually reduced to avoid generation of unwanted transient current signals in the head when clock-pulse recording is interrupted by throwing switch $S_6$ from the A to the B position.

Reference is now made to Fig. 7 wherein there is illustrated in detail the counter 24 and the count selection circuit 25, both enclosed by dotted lines, suitable for operation in the system of Fig. 1. As previously mentioned, counter 24 of Fig. 1 may be any conventional counter capable of counting negative pulses $C_{p2}$ impressed thereon and producing complementary pairs of binary or two-level output signals $Q_1$, $\bar{Q}_1$; $Q_2$, $\bar{Q}_2$; $Q_3$, $\bar{Q}_3$; . . . $Q_n$, $\bar{Q}_n$ indicating, in a true binary or a binary-coded numbering system, the count of the counter. In addition, it was previously mentioned that counter 24 must be capable of counting signals $C_{p2}$ only when signals $Q_{op}$ and $\bar{Q}_{op}$ are respectively 0-level and 1-level signals, and that counter 24 be reset to zero whenever signals $Q_{op}$ and $\bar{Q}_{op}$ are respectively 1-level and 0-level signals. The specific embodiment of counter 24 illustrated in Fig. 7 is responsive to signal $C_{p2}$, $Q_{op}$ and $\bar{Q}_{op}$ impressed thereon for producing signals $Q_1$, $\bar{Q}_1$ . . . $Q_n$, $\bar{Q}_n$ indicating at any instant the count contained in counter 24 at that instant in a true binary numbering system.

As shown in Fig. 7, counter 24 comprises a series of conventional bistable flip-flops $Q_1'$, $Q_2'$, $Q_3'$ . . . $Q_n'$. After each pulse $C_{p2}$ has been applied to counter 24, each of the flip-flops $Q_1'$ to $Q_n'$ stores a single binary digit in a corresponding binary place of the binary number representing the count of the counter. In the counter illustrated, flip-flop $Q_1'$ stores the binary digit corresponding to the least significant binary place, $Q_2'$ stores the next to the least significant binary digit, and so forth, $Q_n'$ storing the most significant binary digit of the binary number representing the count of the counter. As is well known in the art, a conventional binary numbering system may be defined as a numbering system wherein a quantity is represented by a group of binary digits having weights or powers of two. Accordingly, each binary digit of a group has a weight double that of the immediately lesser order or significant binary digit and one-half that of the immediately greater order binary digit of the group. Accordingly, a binary one stored in flip-flop $Q_1'$ has a weight or significance of 1, a binary 1 stored in flip-flop $Q_2'$ has a weight or significance of 2, a binary 1 stored in flip-flop $Q_3'$ has a weight or significance of 4, and so forth in ascending powers of 2 with a binary 1 stored in flip-flop $Q_n'$ having a weight or significance of $2^{n-1}$. In accordance with the conventions herein employed, therefore, 1-level true output signals $Q_1$, $Q_2$, $Q_3$ . . . $Q_n$, produced by flip-flops $Q_1'$, $Q_2'$, $Q_3'$ . . . $Q_n'$ represent respective weights of $2^0$, $2^1$, $2^2$ . . . $2^{n-1}$. Conversely, a 0-level true output signal such as $Q_k$ of a flip-flop, indicating that the flip-flop is storing a binary 0, corresponds to a 0 weight or value.

A true binary flip-flop counter for counting pulses $C_{p2}$ wherein flip-flops $Q_1'$ to $Q_n'$ simultaneously assume their succeeding count states upon reception of each $C_{p2}$ count signal is fully described and claimed in co-pending U.S. patent application, Serial No. 245,860, for "High-Speed Flip-Flop Counter," by Eldred C. Nelson, filed September 10, 1951. The discussion herein of counter 24 is accordingly brief, emphasis being placed on the manner in which the Nelson counter is modified to be re-set by signals $Q_{op}$ and $\bar{Q}_{op}$ in the manner previously discussed.

In order to facilitate an explanation of the mechanization of counter 24 in relation to the state of flip-flops $Q_1'$ to $Q_n'$ for each count, logical Boolean algebra is utilized to identify the signals applied to the 1 and the 0 inputs of the flip-flops. Logical Boolean algebra, as is well known in the art, is based on binary representation of signal values, and is utilized to indicate the mathematical or physical relationship between various binary signals. There are two basic operations in Boolean algebra, commonly referred to as the logical "and" operation and the logical "or" operation. Signals representing binary values which are combined in a logical Boolean function by a logical "and" symbol, are analogous to the application of the signals to separate inputs of a logical "and" circuit. Signal symbols connected in a Boolean equation by logical "or" symbols are analogous to the application of the signals to the separate inputs of a logical "or" circuit. A logical "and" circuit, as defined herein, is a circuit for receiving a plurality of binary input signals and for producing a single output signal having a 1-level value when, and only when, all the input binary signals are simultaneously 1-level signals. A logical "or" circuit may be defined as a circuit responsive to a plurality of binary input signals for producing a single output signal having a 1-level value when at least one of the input signals applied thereto is a 1-level signal. A comprehensive discussion of the application of logical Boolean algebra to the mechanization of logical gating circuitry is found in an article entitled "An Algebraic Theory for Use in Digital Computer Design" by Eldred C. Nelson in the "IRE Transactions-Electronic Computers," September 1954, pages 12 to 21 inclusive.

Table I below illustrates the stable states of flip-flops $Q_1'$ to $Q_n'$ corresponding to successive decimal counts of counter 24. In the table, the decimal equivalent counts of the counter appear in the left-hand column of the table and the corresponding stable states of the flip-flops are indicated symbolically by 1 and 0 digits in the remaining columns of the table. It is assumed for convenience that flip-flops which may be provided in counter 24 between flip-flops $Q_3'$ and $Q_n'$ are all in their 0-representing states for the decimal equivalent values included in the table.

*Table I*

| Decimal equivalent | Flip-flops | | | | |
|---|---|---|---|---|---|
| | $Q_1'$ | $Q_2'$ | $Q_3'$ | . . . | $Q_n'$ |
| 0 | 0 | 0 | 0 | . . . | 0 |
| 1 | 1 | 0 | 0 | . . . | 0 |
| 2 | 0 | 1 | 0 | . . . | 0 |
| 3 | 1 | 1 | 0 | . . . | 0 |
| 4 | 0 | 0 | 1 | . . . | 0 |
| 5 | 1 | 0 | 1 | . . . | 0 |
| 6 | 0 | 1 | 1 | . . . | 0 |
| 7 | 1 | 1 | 1 | . . . | 0 |
| . | . | . | . | | . |
| . | . | . | . | | . |
| . | . | . | . | | . |
| $2^{n-1}$ | 0 | 0 | 0 | . . . | 1 |

Although various symbols have been utilized for representing the logical "and" and the logical "or" functions of a Boolean equation, a dot (.) or parenthesis ( ) will be exclusively utilized herein to represent the logical "and" function and a plus sign (+) between signal symbols will herein be utilized to indicate the logical "or" function. The signals applied to the 1-input and the 0-input of a flip-flop of counter 24 will hereinafter be indicated by a 1 and a 0, respectively, followed by the symbol identifying the flip-flop. For example, the signal applied to the 1-input of flip-flop $Q_1'$ will be identified by the symbol $1Q_1$. Similarly, the signal applied to the 0-input of flip-flop $Q_1'$ will be identified by the symbol $0Q_1$.

From Table I above it is noted that flip-flop $Q_1'$ is triggered to its opposite state upon each succeeding count. Thus, flip-flop $Q_1'$ alternately stores a binary 1 and a binary 0 upon each succeeding count pulse applied to counter 24. Since, as previously explained, flip-flops $Q_1'$ to $Q_n'$ of counter 24 are each triggered to its opposite state whenever a signal is simultaneously applied to both its 1 and its 0 inputs, an expression representing the triggering function of flip-flop $Q_1'$, may, therefore, be expressed logically as:

$$1Q_1=0Q_1=C_{p2}$$

A further study of Table I indicates that each of the flip-flops $Q_2'$ to $Q_n'$ is triggered to its opposite state on the succeeding pulse only when all flip-flops representing lower order binary digital places of the counter are presently in their respective 1-representing states. At all other times each of the flip-flops $Q_2'$ to $Q_n'$ are unaffected by a change in count of counter 24. For example, flip-flop $Q_2'$ alters its state on the succeeding pulse whenever $Q_1'$ is now in the 1-representing state, but remains unchanged in state when flip-flop $Q_1'$ is presently in the 0-representing state. Similarly, flip-flop $Q_3'$ is changed to the opposite state as indicated in Table I when flip-flops $Q_1'$ and $Q_2'$ are both presently in their 1-representing states. Thus, the logical Boolean equation representing the 1- and 0-input signals to each of the flip-flops $Q_2'$ to $Q_n'$ may be written as:

$$1Q_2=0Q_2=Q_1.C_{p2}$$
$$1Q_3=0Q_3=Q_1.Q_2.C_{p2}$$
$$\vdots$$
$$1Q_n=0Q_n=Q_1.Q_2.Q_3 \ldots Q_{n-1}.C_{p2}$$

Although the above logical Boolean expressions describing the input signals to flip-flops $Q_1'$ to $Q_n'$ of counter 24 satisfy the conditions illustrated in Table I above, the logical expressions must now be modified to include the reset functions provided by signals $Q_{op}$ and $\bar{Q}_{op}$ previously discussed. It has been determined, from the discussion of Fig. 1, that counter 24 must count pulses $C_{p2}$ so long as signals $Q_{op}$ and $\bar{Q}_{op}$ are respectively 0-representing and 1-representing signals. It was further established that when signals $Q_{op}$ and $\bar{Q}_{op}$ have respective 1-level and 0-level values, counter 24 is reset to its 0 value, i.e., flip-flops $Q_1'$ to $Q_n'$ are all reset to their respective 0-representing states. More specifically, the above functions describing the input signals to the flip-flops included in counter 24 must incorporate signals $Q_{op}$ and $\bar{Q}_{op}$ in a manner whereby none of the flip-flops may be triggered to its 1-state unless $Q_{op}$ and $\bar{Q}_{op}$ are respectively 0-level and 1-level signals. Since signals $Q_{op}$ and $\bar{Q}_{op}$ are complementary, this may be accomplished by incorporating by a logical "and" function signal $\bar{Q}_{op}$ in the function describing the signals to the 1-inputs of each of the flip-flops in the counter. Thus, the logical functions for the input signals to the flip-flops $Q_1'$ to $Q_n'$, including this additional term, may be expressed as follows:

$$1Q_1=\bar{Q}_{op}.C_{p2}$$
$$0Q_2=C_{p2}$$
$$1Q_2=\bar{Q}_{op}.Q_1.C_{p2}$$
$$0Q_2=Q_1.C_{p2}$$
$$1Q_3=\bar{Q}_{op}.Q_1.Q_2.C_{p2}$$
$$0Q_3=Q_1.Q_2.C_{p2}$$
$$\vdots$$
$$1Q_n=\bar{Q}_{op}.Q_1.Q_2.Q_3 \ldots Q_{n-1}.C_{p2}$$
$$0Q_n=Q_1.Q_2.Q_3 \ldots Q_{n-1}.C_{p2}$$

Conversely, it is desired that all of the flip-flops $Q_1'$ to $Q_n'$ be simultaneously triggered to their 0-representing states whenever signals $Q_{op}$ and $\bar{Q}_{op}$ are respectively 1-level and 0-level signals. This may be readily accomplished by adding the term $Q_{op}$, as a logical "or" function in each of the above functions describing the 0-input signals of the flip-flops $Q_2'$ to $Q_n'$, signals $C_{p2}$ being always applied to the 0 input of flip-flop $Q_1'$. The resulting logical Boolean equation defining the input signals applied to the 1 and the 0 inputs of each of the flip-flops in counter 24, therefore, become:

$$1Q_1=\bar{Q}_{op}.C_{p2}$$
$$0Q_1=C_{p2}$$
$$1Q_2=\bar{Q}_{op}.Q_1.C_{p2}$$
$$0Q_2=(Q_{op}+Q_1)C_{p2}$$
$$1Q_3=\bar{Q}_{op}.Q_1.Q_2.C_{p2}$$
$$0Q_3=(Q_{op}+Q_1.Q_2)C_{p2}$$
$$\vdots$$
$$1Q_n=\bar{Q}_{op}.Q_1.Q_2.Q_3 \ldots Q_{n-1}.C_{p2}$$
$$0Q_n=(Q_{op}+Q_1.Q_2.Q_3 \ldots Q_{n-1})C_{p2}$$

The mechanization of counter 24 from the logical Boolean equation above derived readily follows when it is remembered that each logical "and" function included in an equation is provided in the counter by a corresponding logical "and" circuit. Similarly, each logical "or" function of an equation is provided by a corresponding logical "or" circuit in the counter. Each logical "and" circuit in the counter is symbolically indicated in Fig. 7 as in Fig. 6. Each logical "or" circuit of the counter 24 is represented symbolically by a semicircle with a plus sign (+) in the symbol. For example the "and" function $\bar{Q}_{op}.C_{p2}$ defining the 1 input signals $1Q_1$ of flip-flop $Q_1'$ is mechanized in the counter 24 by a logical "and" circuit 701 for receiving signals $\bar{Q}_{op}$, $C_{p2}$ and for providing output signals which are impressed on the 1 input of flip-flop $Q_1'$. A logical "and" circuit 702, for receiving input signal $\bar{Q}_{op}$, $Q_1$, $C_{p2}$, and for producing output signals which are impressed on the 1 input of flip-flop $Q_2'$, is provided for satisfying the logical "and" function $$Q_{op}.Q_1.C_{p2}$$

defining the signals to be applied to the 1 input of flip-flop $Q_2'$. The logical equation defining signals $0Q_2$ impressed on the 0 input of flip-flop $Q_2'$ may be analyzed as an "or" function $Q_{op}+Q_1$ and an "and" function combining signals $Q_{op}+Q_1$ with signals $C_{p2}$. In mechanizing the above function, therefore, a logical "or" circuit 703 is provided for receiving signals $Q_{op}$, $Q_1$ and for providing output signals which are applied to a first input of a logical "and" circuit 704. Signals $C_{p2}$ are applied to a second input of logical "and" circuit 704, the output signals of logical "and" circuit 704 being directly applied to the 0 input of flip-flop $Q_2'$. In a similar manner, the remaining logical equations defining the input signals to flip-flops $Q_3'$ to $Q_n'$ of counter 24 are satisfied by logical "and" and logical "or" circuits provided in the counter 24 of Fig. 7. Since the mechanization of the remaining functions directly follows from an examination of the corresponding logical equations, further explanation of the mechanization of the counter 24 is, therefore, deemed unnecessary.

Count selection circuit 25 is provided for receiving signals $Q_1$, $\bar{Q}_1$ to $Q_n$, $\bar{Q}_n$ produced by counter 24 and for producing first and second 1-level pulse output signals $C_1$ and $C_2$ when a first and a second count, respectively, are registered in counter 24. As previously explained in connection with Fig. 1, the first and the second counts of counter 24, when signals $C_1$ and $C_2$ are respectively produced, are selectively determinable by count selection circuit 25. This is accomplished by providing two sets of single-pole double-throw selector switches $S_1$ to $S_n$ and $S_1'$ to $S_n'$, each having stationary contacts A and B and a single movable contact. The A and the B contacts of each switch are respectively connected to the true and the true-complement outputs of a corresponding one of the flip-flop $Q_1'$ to $Q_n'$. Thus, the A contacts of switches $S_1$ and $S_1'$ are both connected to the true output $Q_1$ of flip-flop $Q_1'$, and the B contacts of both switches are directly connected to the true-complement output $\bar{Q}_1$ of the flip-flop and so on.

The movable contacts of switches $S_1$ to $S_n$ are directly connected to corresponding separate inputs of a logical "and" circuit 711, and the movable contacts of switches $S_1'$ to $S_n'$ are respectively connected to corresponding separate inputs of a logical "and" circuit 712. Output signals $C_1$ are directly derived from the output of logical "and" circuit 711, and output signals $C_2$ are directly derived from the output of the logical "and" circuit 712. For convenience, the signals appearing on the movable contacts of switches $S_1, S_2, S_3, \ldots S_n$ are respectively designated $A_1, A_2, A_3, \ldots A_n$. In a similar manner the signals appearing on the movable contacts of switches $S_1', S_2', S_3', \ldots S_n'$ are respectively designated as signals $A_1', A_2', A_3', \ldots A_n'$. In accordance with Boolean algebra, therefore, signal $C_1$ and $C_2$ may be defined by the logical function:

$$C_1=A_1.A_2.A_3.\ldots A_n$$
$$C_2=A_1'.A_2'.A_3'\ldots A_n'$$

A 1-level $C_1$ signal, therefore, will be produced whenever signals $A_1$ to $A_n$ are all simultaneously 1-level signals, and will have a 0-level value whenever any one of these signals has a 0-level value. Similarly, signals $C_2$, produced by logical "and" circuit 712, will have a 1-level value when, and only when, signals $A_1'$ to $A_n'$ are all simultaneously 1-level signals. Accordingly, the values of signals $Q_1$, $\bar{Q}_1$ to $Q_n$, $\bar{Q}_n$ required for producing a 1-level $C_1$ signal will be dependent upon the setting of the switches $S_1$ to $S_n$ and, similarly, the values of signals $Q_1$, $\bar{Q}_1$ to $Q_n$, $\bar{Q}_n$ required for producing a 1-level $C_2$ signal will depend upon the setting of the switches $S_1'$ to $S_n'$.

By way of illustration, assume that it is desired to produce a 1-level $C_1$ signal at a particular count of counter 24, represented by flip-flops $Q_1'$, $Q_2'$, $Q_3'$ and $Q_n'$ storing, respectively, binary 1, 1, 0, and 0. True output signals $Q_1$, $Q_2$, $Q_3$, and $Q_n$ will, therefore, have respective values of 1, 1, 0, and 0, and the true-complement output signals $\bar{Q}_1$, $\bar{Q}_2$, $\bar{Q}_3$ and $\bar{Q}_n$ will have respective values of 0, 0, 1 and 1. In order to obtain 1-level signals $A_1$, $A_2$, $A_3$ and $A_n$ from switches $S_1$, $S_2$, $S_3$ and $S_n$ at this count, switches $S_1$ and $S_2$ must be in their A position, and switches $S_3$ and $S_n$ must be in their B position as illustrated. If it is desired to produce a $C_2$ 1-level pulse on a count of counter 24 represented by binary digits 0, 1, 1, and 0 stored respectively in flip-flops $Q_1'$, $Q_2'$, $Q_3'$ and $Q_n$, Switches $S_1'$ and $S_n'$ must be in their B positions and switches $S_2'$ and $S_3'$ in their A positions.

In conclusion, therefore, there has been disclosed a system for accurately and reliably recording a desired number of clock pulses with in-phase overlap on the timing track of a rotating memory drum. It has been demonstrated that the system of the present invention is adapted to record a desired number of clock pulses on the timing track of the drum irrespective of variations of the angular velocity of the drum, the timing track thus recorded being free from transients or time modulation. In addition it has been shown that the recording system of the present invention is adapted to accurately determine the number of clock pulses and the phase overlap of a previously recorded timing track. It has further been demonstrated that the recording system of the present invention is completely free from mechanical errors.

What is claimed is:

1. A system for recording a desired number of timing pulses with in-phase overlap on a timing channel of a rotating recording drum, said system comprising: first variable frequency means coupled to the recording drum for continuously generating timing pulses and for recording said timing pulses on the channel of the drum, second means coupled to the recording drum and responsive to the rotation thereof for producing revolution-indicating signals indicating the completion of each revolution of the drum; third means coupled to said first means and said second means and responsive to said timing pulses and said revolution-indicating signals for counting said timing pulses and providing output signals indicating the instant during each revolution of the drum when the desired number of timing pulses has been recorded; and fourth means coupled to said second means and said third means and responsive to said revolution-indicating signals and said output signals for comparing the time of occurrence of said revolution-indicating signals with the time of occurrence of said output signals during each of said revolutions to indicate the necessary variance of frequency of said first means for recording the desired number of clock pulses with in-phase overlap on the drum.

2. A system for recording a desired number of clock pulses with in-phase overlap on the timing track of a rotating recording drum, said system comprising: recording means including variable frequency means coupled to the rotating drum for continuously generating clock pulses and for recording said clock pulses on the timing track thereof; revolution-indicating means coupled to the rotating drum and responsive to the rotation thereof for producing an indicating signal once during each revolution of the drum to indicate the completion of the revolution; counting means coupled to said recording means and said revolution-indicating means and responsive to said clock pulses and said indicating signals for producing count selection signals, one of said count selection signals being produced during each revolution of the drum at the instant the desired number of clock pulses has been recorded on the timing track during the revolution; and coincidence means coupled to said revolution-indicating means nad said counting means to receive said indicating signals and said count selection signals for indicating coincidence between said indicating signals and said count selection signals during each of said revolutions, thereby indicating when the desired number of clock pulses has been recorded with in-phase overlap on the timing track of the recording drum.

3. A clock pulse recorder for recording a desired number of clock pulses on a timing track of a continuously rotating magnetic drum, said recorder comprising: a variable frequency generator coupled to the magnetic drum for generating clock pulses, means responsive to said clock pulses for recording same on the drum, an analog-to-digital converter coupled to the drum and responsive to the rotation thereof for producing an origin pulse during each revolution of the drum indicating the time of completion of the revolution; and a counting circuit coupled to said generator and said analog-to-digital converter responsive to said clock pulses and said origin pulses for producing count selection signals indicating the instant during each revolution of the drum when the desired number of clock pulses has been recorded on the timing track, thereby indicating the necessary variance of said generator for recording the desired number of clock pulses on the timing track with in-phase overlap.

4. A system for accurately recording a selected number of clock pulses with in-phase overlap on the timing track of a rotating magnetic drum, said system comprising: a clock pulse recorder coupled to the magnetic drum responsive to generated clock pulses for recording said clock pulses on the timing track; a revolution indicator coupled to the magnetic drum and responsive to the rotation thereof for producing an origin pulse to indicate the beginning of each revolution of the drum; a counter circuit coupled to said clock pulse recorder and said revolution indicator and responsive to said clock pulses and said origin pulses for counting said clock pulse signals and for developing a count selection pulse during each revolution of the drum indicating the instant when the desired number of clock pulses has been recorded on the timing track of the drum during the revolution; and a comparison circuit coupled to said revolution indicator and said counter circuit and responsive to said origin pulses and said count selection pulse for comparing the time relationship between an origin pulse and a count selection pulse during each revolution.

5. The system defined in claim 4 wherein said comparison circuit includes an oscilloscope for indicating the desired time coincidence between said origin pulses and corresponding pulses of said count selection pulses.

6. The system defined in claim 4 wherein said recorder includes an adjustable oscillator for generating a sine wave and further includes a squaring circuit coupled to said oscillator and responsive to said sine wave for producing a corresponding output square wave, a first pulse-forming circuit coupled to said squaring circuit and responsive to said square wave for developing a first series of triggering pulses, each of said first series of triggering pulses being produced in response to the trailing edge of a cycle of said square wave, a second pulse-forming circuit coupled to said squaring circuit and responsive to said square wave for developing a second series of triggering pulses, each of said second series of triggering pulses being developed in response to the leading edge of a cycle of said square wave, a bistable flip-flop coupled to said first and second pulse-forming circuits and having 1 and 0 inputs responsive respectively to said first and second series of triggering pulses and producing complementary two-level voltage output signals indicating the stable state of said bistable flip-flop at any instant, and a clock-writing circuit coupled to said bistable flip-flop and responsive to said voltage output signals for recording said clock pulses on the timing track of the drum.

7. The system defined in claim 4 wherein said recorder includes means for simultaneously producing a positive triggering pulse and a negative triggering pulse in response to each clock pulse produced by said clock pulse recorder; and wherein said revolution indicator includes a reading circuit coupled to the drum and responsive to a single origin indicium recorded thereon for producing an electrical origin signal once during each revolution of the drum, a gate circuit coupled to said clock pulse recorder and said reading circuit and responsive to said positive triggering pulses and said origin signals for producing a gated triggering pulse once during each revolution of the drum corresponding to one of said positive triggering pulses received by said gate circuit in time coincidence with one of said origin signals, and a bistable flip-flop coupled to said clock pulse recorder and said gate circuit and having 1 and 0 inputs responsive respectively to said gated triggering pulses and said negative triggering pulses for producing said origin pulse.

8. The system defined in claim 4 wherein said counter circuit includes a counter for counting said clock pulses and for producing binary output signals indicating the count contained in said counter at any instant, said counter being reset to zero by each of said origin pulses, and said counter circuit further including a count selection circuit coupled to said counter and responsive to said binary output signals for developing said count selection pulses, said count selection circuit having switches for receiving said binary output signals and for selecting desired ones of said binary output signals to produce selected binary output signals, and a logical "and" circuit coupled to said switches and responsive to said selected binary output signals for producing said count selection pulses.

9. A system for recording a selected number of clock pulses on the timing track of a rotating memory drum, said system comprising: a clock-pulse recording circuit coupled to the drum for continuously recording clock signals thereon, said recording circuit including a variable frequency generator for producing a symmetrical wave, a pulse-forming circuit coupled to said generator and responsive to said symmetrical wave for producing a positive and a negative triggering pulse in response to each cycle of said symmetrical wave, a recorder circuit coupled to said generator, said pulse-forming circuit, and the drum to receive said symmetrical wave and said negative triggering pulses for recording said symmetrical wave on the timing track; a revolution indicating circuit coupled to said pulse-forming circuit and the drum and responsive to said positive and negative triggering pulses, and the rotation of said drum for producing a revolution indicating signal once during each revolution of the drum indicating the completion of the revolution, said revolution indicating circuit including a reading circuit coupled to the drum and responsive to a single pulse recorded thereon for producing an origin pulse once during each revolution of the drum, a gate circuit coupled to said pulse-forming circuit and said reading circuit to receive said positive triggering pulses and said origin pulses for selectively gating one of said positive triggering pulses to produce a selected triggering pulse in response to time coincidence between a positive triggering pulse and an origin pulse, a bistable flip-flop coupled to said pulse-forming circuit and said gate circuit and having 1 and 0 inputs responsive, respectively, to said negative triggering pulses and said selected triggering pulses for producing said revolution indicating signal; a counting circuit coupled to said pulse-forming circuit and said revolution indicating circuit and responsive to said negative triggering pulses and said revolution indicating signals for producing a count selection signal once during each revolution of the drum indicating the instant during the revolution that the selected number of clock pulses have been recorded, said counting circuit including a counter responsive to said negative triggering pulses and said revolution indicating signals for counting said negative triggering pulses and for resetting to a zero count upon reception of each of said revolution indicating signals, said counter producing count output signals indicating the count in said counter at any instant, a count selection circuit coupled to said counter and responsive to said count output signals for producing said count selection signals; and a time-comparison circuit coupled to said revolution indicating circuit and said counting circuit and responsive to said revolution indicating signals and said count selection signals for indicating the necessary frequency adjustment of said variable frequency generator to cause each of said revolution indicating signals to occur in time coincidence with a count selection signal thereby indicating that said recording circuit has been properly adjusted for recording the desired timing track.

References Cited in the file of this patent

UNITED STATES PATENTS

| | | |
|---|---|---|
| 2,519,763 | Hoglund | Aug. 22, 1950 |
| 2,573,446 | Ignalls | Oct. 30, 1951 |
| 2,614,169 | Cohen et al. | Oct. 14, 1952 |
| 2,685,646 | Ward | Aug. 3, 1954 |
| 2,710,787 | Witt | June 14, 1955 |
| 2,745,958 | Depp | May 15, 1956 |
| 2,761,968 | Kuder | Sept. 4, 1956 |
| 2,764,463 | Lubkin et al. | Sept. 25, 1956 |
| 2,748,269 | Slutz | May 29, 1956 |
| 2,803,515 | Begun et al. | Aug. 20, 1957 |
| 2,801,407 | Lubkin | July 30, 1957 |